US012607212B2

(12) United States Patent
Marshall

(10) Patent No.: US 12,607,212 B2
(45) Date of Patent: Apr. 21, 2026

(54) COUPLING DEVICE FOR SCAFFOLDING

(71) Applicant: RJM FITTINGS LIMITED,
Manchester (GB)

(72) Inventor: Richard Marshall, Manchester (GB)

(73) Assignee: RJM FITTINGS LIMITED,
Manchester (GB)

( * ) Notice: Subject to any disclaimer, the term of this
patent is extended or adjusted under 35
U.S.C. 154(b) by 370 days.

(21) Appl. No.: 18/260,517

(22) PCT Filed: Jan. 25, 2022

(86) PCT No.: PCT/GB2022/050187
§ 371 (c)(1),
(2) Date: Jul. 6, 2023

(87) PCT Pub. No.: WO2022/157516
PCT Pub. Date: Jul. 28, 2022

(65) Prior Publication Data
US 2024/0068248 A1    Feb. 29, 2024

(30) Foreign Application Priority Data

Jan. 25, 2021    (GB) ...................................... 2100961

(51) Int. Cl.
*F16B 7/04*        (2006.01)
*E04G 7/14*        (2006.01)
(52) U.S. Cl.
CPC .............. *F16B 7/0433* (2013.01); *E04G 7/14*
(2013.01); *Y10T 403/7105* (2015.01); *Y10T*
*403/7194* (2015.01)
(58) Field of Classification Search
CPC .... E04G 7/12; E04G 7/14; E04G 7/16; E04G
7/24; F16B 7/0433; Y10T 403/30;
(Continued)

(56) References Cited

U.S. PATENT DOCUMENTS 1,830,094 A * 11/1931 Davidson .................. E04G 7/14
403/385
2,165,221 A    7/1939 Burton
(Continued)

FOREIGN PATENT DOCUMENTS

BE        410329 A    6/2015
CH        384189 A    11/1964
(Continued)

OTHER PUBLICATIONS

GB2599459 Search Report, Jul. 15, 2021, 2 pages.
Search Report for PCT/GB2022/050187, Jul. 28, 2022, 3 pages.

*Primary Examiner* — Josh Skroupa
(74) *Attorney, Agent, or Firm* — Jacob M. Ward; Ward
Law Office LLC

(57)        ABSTRACT

A coupler device (10), for connecting two overlapping
building elements (V, H) at substantially right angles. The
device includes a main body (11) and two hingedly attached
gate elements (12, 13) extending at perpendicular and offset
axes from the body. Each gate element respectively includes
an associated tightening mechanism, e.g. a rod (17, 20) with
threaded end engaging with a nut (19, 22), for controlling
closing force toward the main body and clamping a building
element. In use, the respective tightening mechanisms (e.g.
nuts on threaded rod) are accessible from substantially the
same direction relative to the main body and not obscured by
the two overlapping building elements when fixed in place.
This may be achieved by the gates, compared to each other,
having a reversed configuration of tightening mechanism
extending between a distal end of the gate relative to a
connection point on the main body.

9 Claims, 4 Drawing Sheets

(58) Field of Classification Search
CPC ......... Y10T 403/7105; Y10T 403/7171; Y10T
403/7194
USPC ................................... 403/49, 385, 396, 400
See application file for complete search history.

(56) References Cited

U.S. PATENT DOCUMENTS

| | | | | |
|---|---|---|---|---|
| 2,194,883 A * | 3/1940 | Burton | ...................... | E04G 7/14 |
| | | | | 403/385 |
| 4,566,819 A * | 1/1986 | Johnston | ................... | E04G 7/16 |
| | | | | 403/385 |
| 6,786,302 B2 * | 9/2004 | Liew | ......................... | E04G 7/14 |
| | | | | 248/316.5 |
| 11,959,292 B2 * | 4/2024 | Melic | ...................... | E04G 7/14 |

FOREIGN PATENT DOCUMENTS

| | | | | | | |
|---|---|---|---|---|---|---|
| DE | 2237988 | A1 | * | 2/1973 | ............... | E04G 7/14 |
| FR | 790857 | A | * | 11/1935 | ............... | E04G 7/16 |
| FR | 1195641 | A | * | 11/1959 | ............... | E04G 7/14 |
| GB | 1225776 | A | * | 3/1971 | ............... | E04G 7/16 |
| GB | 2029497 | A | * | 3/1980 | ............... | E04G 7/14 |
| GB | 2562092 | A | | 11/2018 | | |
| JP | 2008208539 | A | | 9/2008 | | |
| KR | 20150102270 | A | | 9/2015 | | |
| KR | 101619495 | B1 | | 5/2016 | | |
| WO | 2013132255 | A1 | | 9/2013 | | |
| WO | 2017020067 | A1 | | 2/2017 | | |

* cited by examiner

COUPLING DEVICE FOR SCAFFOLDING

The present invention relates to a fitting for scaffolding, i.e. a coupling device, particularly a coupler for connecting two tubular elements together.

BACKGROUND TO THE INVENTION

A single coupler, commonly used in scaffolding applications, connects two tubes at right angles. The device typically features an engaging plate and a clamping portion. Tubes are arranged to overlap perpendicularly and secured by arranging the plate on one outermost surface of one tube while tightening a nut onto a threaded member spanning across the other tube. When in place the single coupler sandwiches the two tubes together, but only has one tightening point applying force on the tubes. As such, a single coupler fitting is not designed to be load bearing but may be used for connecting board supports (transoms) or putlogs to ledgers in scaffolding and is also used in lighting rigs, staging and guard rails. A single coupler comprises approximately 40% of fittings in any erected scaffold structure and is used for all boarded platforms in such structures. To meet load bearing requirements, a double coupler must be used.

A double coupler may fix two tubes at ninety-degrees but features two clamping portions, each with its own tightening structure (e.g. a nut onto a threaded member) for enclosing a tube. Each tube is, therefore, secured individually for increased load-bearing strength, however, in most commonplace designs the tightening elements are accessed from opposite directions. Double couplers are a heavy-duty fitting designed for use in all types of scaffolding construction and also in lighting rigs, staging and guard rails.

Proposals have been made for alternative double coupler constructions in the prior art. For example, U.S. Pat. No. 4,566,819 features a coupler for two tubular sections where tightening elements are facing in the same direction, but tightening of a second nut is obscured by the horizontal tubular section because it is effectively located behind it if viewed from a frontal direction. Access is only convenient (e.g. by a torque gun) if the horizontal building element is swung out of the way by virtue of an elaborate swivel connection in the main body. WO2017020067 also discloses a construction featuring tightening elements facing in the same direction but, indeed, the gates for securing the tubular members must also extend from the same side, resulting in an elaborate device for securing tubular members against each other.

SUMMARY OF THE INVENTION

The present invention seeks to provide an improved coupler construction that can be used in either single or double coupler applications.

In a broad aspect the present invention is defined as a fitting for scaffolding according to claim 1; a configuration that enables "all nuts to the inside". For example, the invention relates to a coupler device, for connecting two overlapping building elements at substantially right angles, comprised of: a main body or backbone plate; a first gate or arm element hingedly attached from the main body for pivoting about a first axis; a second gate or arm element hingedly attached from the main body for pivoting about a second axis, perpendicular to the first axis; each gate or arm element respectively including an associated tightening mechanism for controlling closing force of the respective gate toward the main body; wherein the respective tightening mechanisms are accessible from substantially the same direction relative to the main body.

According to the invention, overlapping building elements are securable generally in a fixed position only, i.e. overlapping at right angles and not being able to swivel relative to one another. The tightening mechanisms are located for accessibility to be tightened, in a direct line-of-sight from one side of one of the fixed building elements. In practice, at least the "rear" tightening nut is located above a plane defined by one of the building elements. The rearward nut may be located at any elevated position clear and/or accessible in spite of the building member secured by the forward nut.

In one form each tightening mechanism includes male and female threaded members. In a particular form, one end of a first tightening mechanism is movably attached to a distal end of the first gate, while an end of a second tightening mechanism is movably attached from the main body. In this form a free end of the first tightening mechanism is engageable with a portion of the main body, while a free end of the second tightening mechanism is engageable with a distal end of the second gate. In this way, a female threaded member (e.g. a nut) associated with each tightening mechanism is accessible from substantially the same direction.

It will be apparent that a main purpose of the fitting according to the invention is that it can replace and do the same job as a single coupler, while being considerably stronger/load bearing to minimise the need for extra structural tubes to be erected to strengthen the scaffold.

As mentioned, it is noteworthy that the first gate (alternatively termed the "rear" gate relative to a user's perspective during installation) is raised compared to a conventional double or single coupler. This is preferable so that the tightening nut is clear of a horizontal building member and thereby creates room to access the nut and thread, while giving the transoms a flat surface for boarded platforms (or anything which would need a flush finish or level platform). By virtue of this feature the invention becomes a load bearing fitting having two fixed points connecting the transoms to the ledgers.

By way of example the fitting may have a 6.2 kN to a 9.1 kN or greater load rating, and thereby qualifying as a load bearing fitting, even for single coupler applications. In other words, the invention can achieve the same purpose and have far more strength, e.g. making any scaffold resistant to a lot more force.

As a result, the invention saves time and scaffolding materials since no extra structural tubes have to be erected.

The invention can also be used as a double coupler, with comparable load bearing capability.

As a consequence of the fitting's configuration, in use, gates and bolts will be to the inside of the scaffold, meaning there will be reduced need to lean out over the scaffold, thereby minimising risk of a fall. When having all bolts and threads facing the scaffolder, all in one place and quick to access, there will be less movements required for implementation and, thus, time saved in erecting scaffolding.

Particularly, when using the invention in a tight space, e.g. against a wall, the gate thread can be arranged to the inside of the standard, meaning the standard could be placed tight up against a vertical wall. Also, by use of the invention it will be possible to achieve a flush finish on the outside of the scaffolding for any sheeting, monoflex, debris netting and hoarding to be applied.

Since the invention enables a load bearing fitting, every transom and purling which the fitting is used on can become structural. In use for any beam work (e.g. temporary roofs, bridging scaffolds, hanging scaffolds, cantilever scaffold), the fitting will strengthen the top cord of the beam since said top cord blunts the stresses and strains of any weight placed on the structure.

When using the fitting on a transom (i.e. supporting cross bar), where it would be fixed with a load bearing fitting, scaffold ties can be placed straight off the transom itself; saving time, material and the need for erecting more structural tubes for ties.

In practice a fitting according to the invention can be the same size and weight as a standard double coupler. Accordingly, it will have a similar manufacturing cost.

DETAILED DESCRIPTION OF THE INVENTION

The following description presents an exemplary embodiment and, together with the drawings, serves to explain principles of the invention. However, the scope of the invention is not intended to be limited to the precise details of the embodiments or exact adherence with all features, since variations will be apparent to a skilled person and are deemed also to be covered by the description. Indeed, the present disclosure may separately define a number of discrete inventions. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

Figure 1:
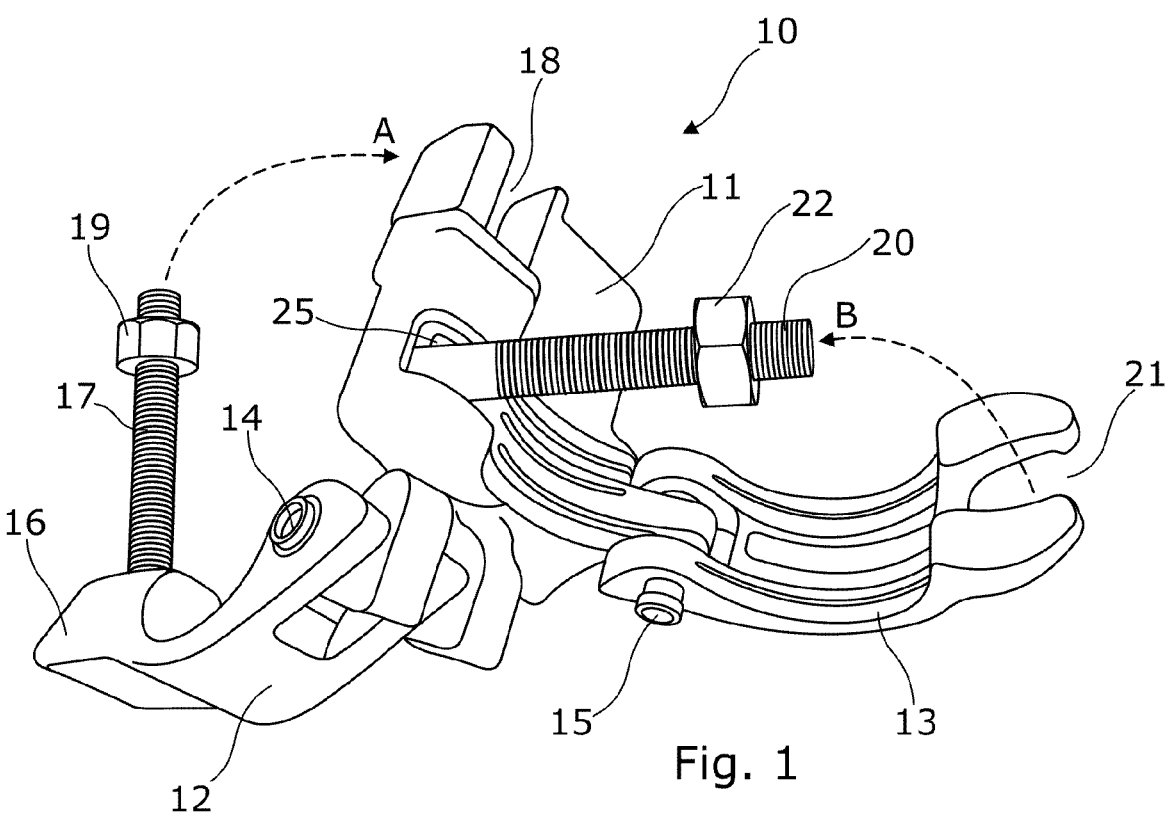
FIG. 1 illustrates a first open perspective view of a coupling device according to the invention.
Figure 2:
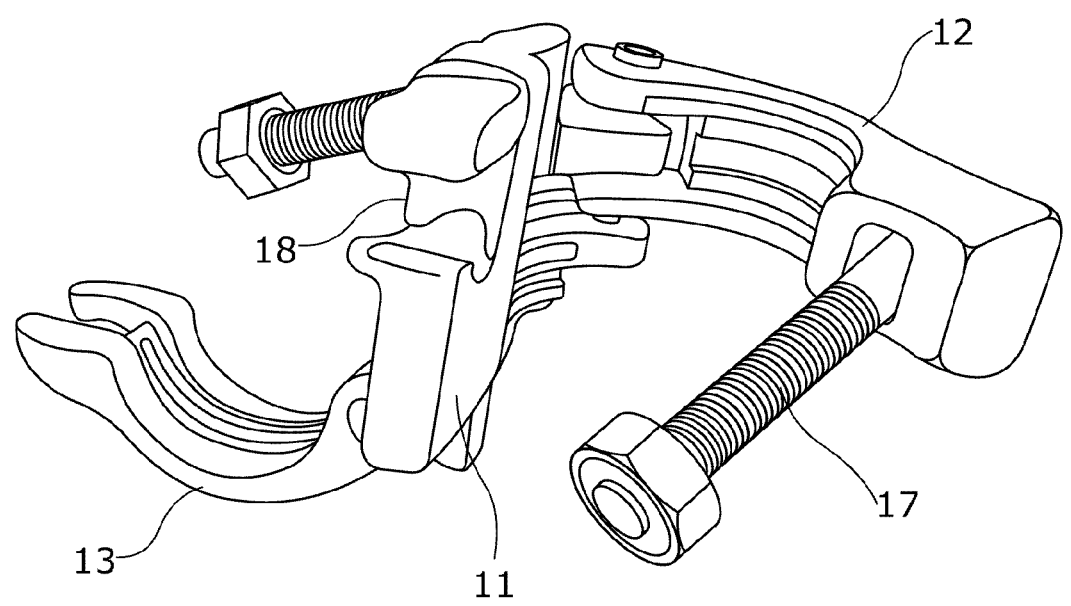
FIG. 2 illustrates a second open view of the coupling device, from a different perspective.

FIGS. 1 and 2 show an overview of a coupling device 10, in open configuration prior to use. The device 10 is comprised of a main body block 11 that, in use, forms a buffer layer between elements to be joined. Two pivoting gate elements, 12 and 13 respectively, extend from opposite sides of the main body 11.

Each gate is pivoted on a pin, 14 and 15 respectively, that each form a hinge with the main body 11. The respective pins effectively provide pivot axes for the gates that are perpendicular and offset to each other, such that the gates 12 and 13 open and close in different orientations to each other relative to the main body.

First or rear gate 12 features a distal end 16 accommodating a threaded member 17 to extend therefrom. The threaded member is articulated relative to distal end 16 (by passing through an opening therein) as is shown in FIG. 2. Threaded member 17, as the gate 12 closes, will moves toward a yoke 18 at an edge of main body 11, opposite pivot pin 14. The direction of movement is denoted by arc A. Once accommodated by yoke 18, a nut 19 is tightened upon threaded member 17, thereby causing a clamping action of gate 12 against any element captured between gate 12 and body 11, as will be described in further detail below.

While it is apparent from FIG. 1 that gate 12 includes an extending threaded member (17), for coupling at a yoke built into body 11; by contrast, a second threaded member 20 is mounted for articulated movement to extend from body 11 and to be accommodated by a yoke 21 at a distal end of second gate 13. A nut 22 provides a tightening function so that gate 13 can clamp and secure any item captured between it and body 11.

Both gates have a semi-circular internal contacting surface, sized to correspondence at least approximately with a tubular or bar-like building member to be secured by the device. When assembled and in use, each gate 12 and 13 clamps a tube in place against the body 11. The building members are maintained at a distance corresponding to and defined by a width of the body 11.

FIG. 2 shows a different perspective view where the opening of yoke 18, for receiving threaded member 17, is in the foreground.

Figure 3:
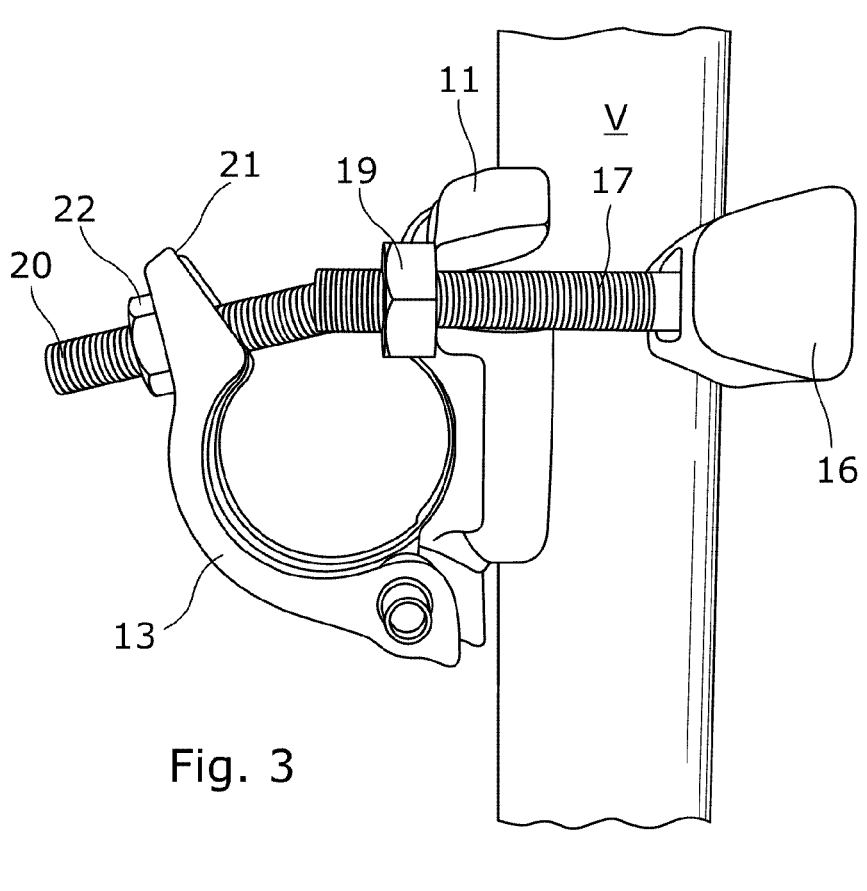
FIG. 3 illustrates a closed side view of the coupling device installed about a tubular element.

FIG. 3 illustrates a side view (or end view relative to a horizontal tube when installed) wherein the device is coupled to a vertical scaffold member V. In this configuration threaded member 17, extending from distal end 16 of gate 12, can be seen spanning across member V to be received by yoke 18 and secured by nut 19. When tightened, nut 19 provides controllable clamping force on member V toward body 11, via gate 12.

No horizontal scaffolding member is yet in place, but gate 13 can be seen in a closed configuration wherein threaded member 20, extending from body 11, is cradled by yoke 21 at the distal end of gate 13. Nut 22 controls a tightening force to clamp a member against body 11. From this perspective, a semi-circular surface is visible protruding from body 11 that cooperates with the inner surface of gate 13 to provide a substantively circular contact portion for accommodating a scaffolding member.

In the use position of FIG. 3 it will be apparent that anything with a flat surface, e.g. a planar wall, hoarding, monoflex, debris netting, etc, can abut up against the vertical tube V proximate gate 12 (with distal end 16 as shown). Access to the tightening mechanisms (19, 22) of the fitting are not impeded because these face toward a user, inside the scaffold structure and opposite any external cladding. Furthermore, it is apparent that nut 19 and threaded member 17 are located above the circular opening that locates a horizontal building member in place (not shown). Visible access above a plane defined by an upper surface of the horizontal member enables unimpeded manipulation of nut 19. This is in contrast to a solution where the yoke 18 and threaded member 17 is located at a mid-point of the circular clamping area. Such a configuration would be possible if the body were thicker, but the end of threaded member 17 would not be frontally accessible once a horizontal building member was in place.

Figure 4:
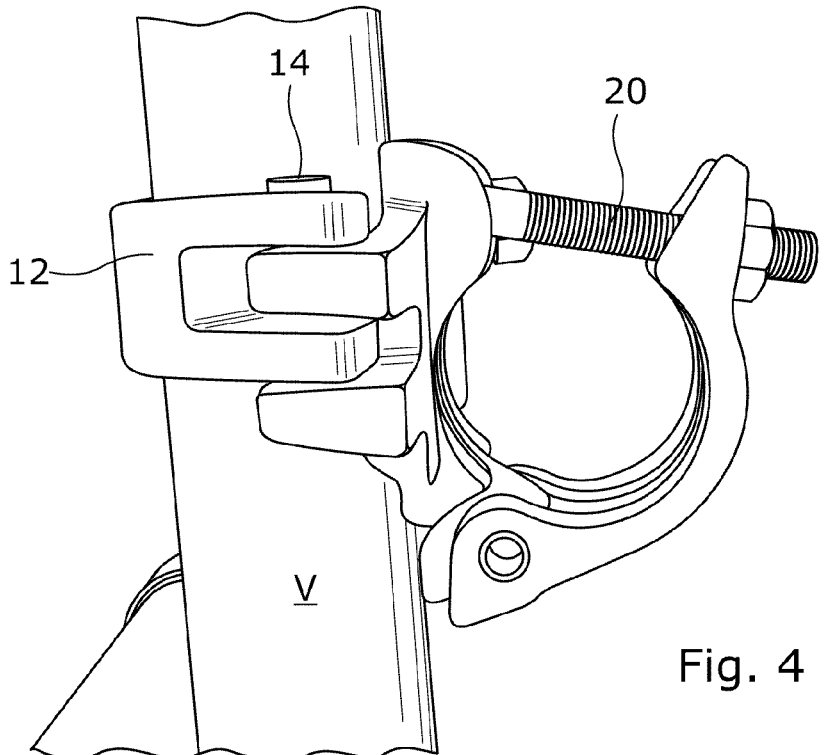
FIG. 4 illustrates a closed side view of the coupling device from the opposite side to that of FIG. 3.

FIG. 4 shows an opposite side view to that of FIG. 3, where the hinge for gate 12, formed by pin 14, is clearly visible.

Figures 5, 6:
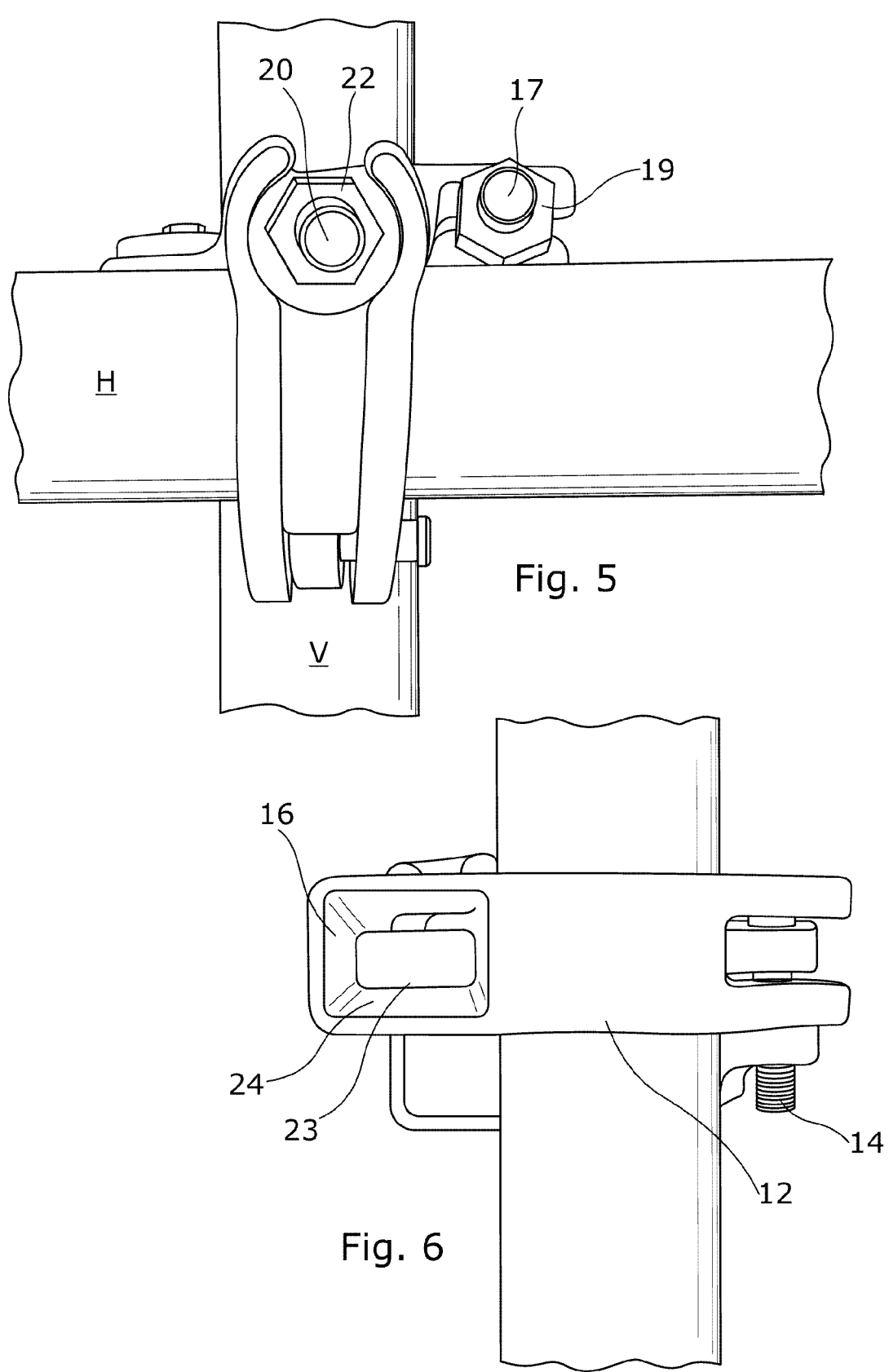
FIG. 5 illustrates a closed front view of the coupling device connecting two tubular elements together.
FIG. 6 illustrates a closed rear view of the coupling device installed about a vertical tubular element.

FIG. 5 illustrates a horizontal scaffolding member H in place and how, in use, all nuts/bolts (22, 19) and threads (20, 17) required to tighten the scaffolding bar/tubes are facing the same direction for access by a user. In particular, the access direction can be arranged to the inside of a scaffold, mitigating any requirement for a user to lean outside the scaffold structure during its erection. Furthermore, both nuts 19 and 22 are accessible above a plane defined by an upper surface of the horizontal scaffolding member H, and not obscured thereby.

It is also noteworthy that the first gate (as mentioned, alternatively termed the "rear" gate relative to a user's perspective during installation and hidden from view in FIG. 5) is hingedly attached in a raised position on main body 11, compared to a conventional double or single coupler. In other words, the connecting rods (17, 20) are closer to being positioned on the same plane, compared to a conventional design where the connecting rod of a "rear" gate is hidden behind building member H. This raised configuration, with nuts/rods on the same (or close) plane, is necessary so that the tightening nut 19 is clear of the horizontal building member H and thereby creates room to access the nut and thread, e.g. by a torque gun, while giving the transoms a flat surface for boarded platforms (or anything which would need a flush finish or level platform). By virtue of this feature the invention becomes a load bearing fitting having two fixed points connecting the transoms to the ledgers.

While both nuts 19 and 22 are shown at about the same access level in FIG. 5, the rear tightening mechanism 17, 19 associated with vertical member V may be located in a higher position than pictured, so long as it is not substantially below the upper surface of horizontal member H where it would be obscured.

FIG. 6 shows a rear view of the device where gate 12 is seen wrapping around vertical member V (there is no horizontal member H in the FIG. 6 illustration). Distal end 16 of gate 12 includes an opening, through which threaded member 17 passes. A widened end 23 of threaded member 17 holds it within a recess 24 at distal end 16 and enables relatively free movement for threaded member to be directed into yoke 18 on the other side (from the perspective of FIG. 6).

A comparable widened end (of threaded member 20), proximate a recess/hole formed into the main body 11, enables the second threaded member 20 to articulate and engage with yoke 21. A through-hole 25 for this purpose is visible in FIG. 1.

Figures 7, 8:
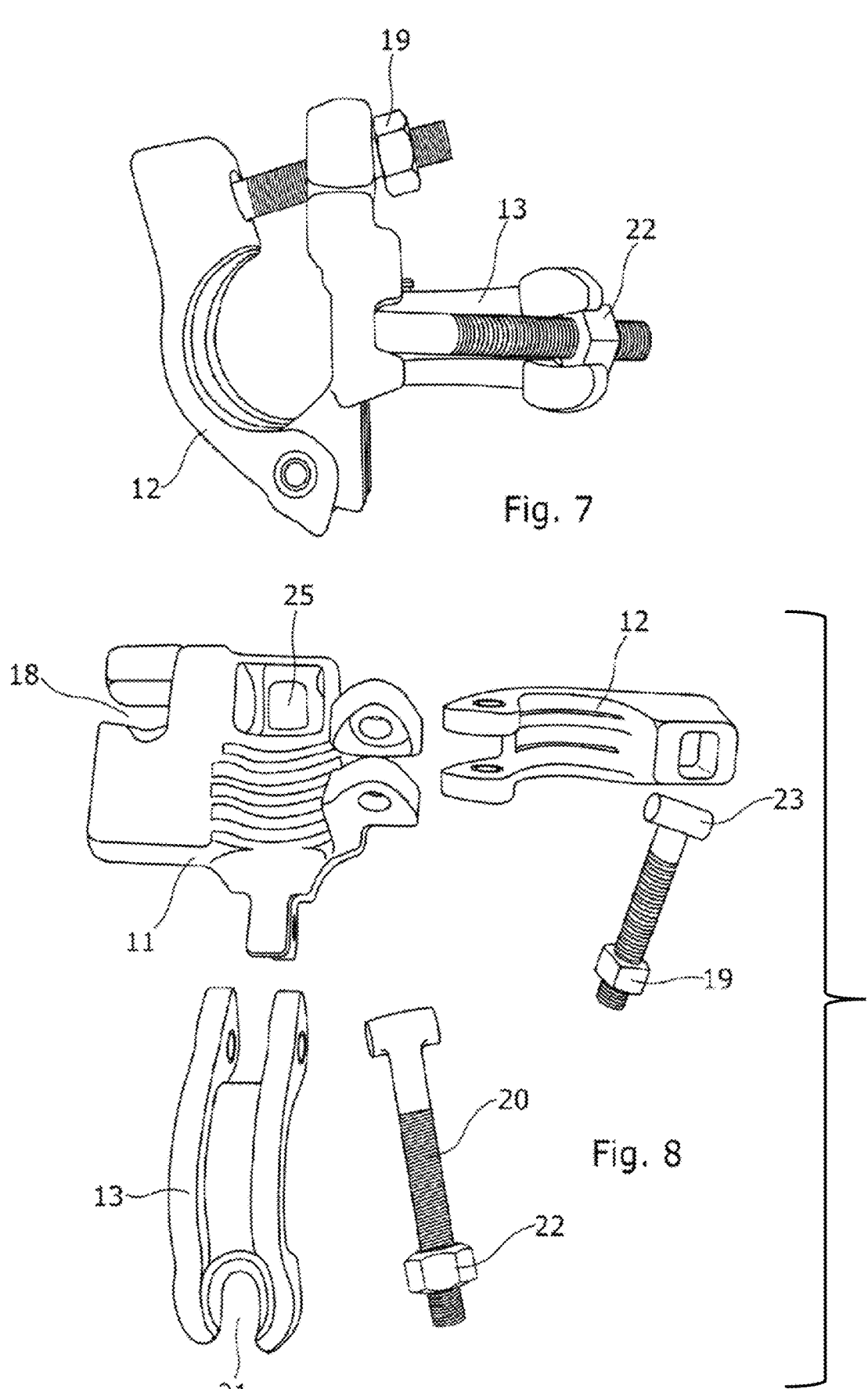
FIG. 7 illustrates a plan view of the device.
FIG. 8 illustrates an exploded view of components that comprise the coupling device.

FIG. 7 illustrates a plan view of the device in a closed configuration, where gate 12 would clamp a vertical member (not shown) against body 11 by tightening of nut 19. A horizontal member (not shown) would be clamped by gate 13 by tightening of nut 22.

FIG. 8 illustrates an exploded view of all components (with the exception of pins 14, 15) that comprise the coupler device of the invention. It is particularly visible that the widened end 23 of each connecting rod/threaded member is a T configuration.

It will be apparent from the foregoing that the coupler device is principally comprised of a main body, a first gate or arm element hingedly attached from the main body for pivoting about a first axis, a second gate or arm element hingedly attached from the main body for pivoting about a second axis, substantially perpendicular to the first axis; each arm element respectively including an associated tightening mechanism for controlling closing of the respective gate relative to the main body; wherein the respective tightening mechanisms are accessible from substantially the same direction relative to the main body.

Alternative configurations are possible. For example, the illustrated configuration could be reversed such that the tightening nut 19 is housed within recess 23 while widened end 23 is accommodated by yoke 18. In this way, nut 22 must be tightened adjacent opening 25 while a widened end of member 20 is accommodated by the yoke 21 of gate 13.

The invention can be summarised as a coupler device, e.g. for connecting two overlapping building elements (V, H) in a fixed configuration, e.g. at substantially right angles, that includes a main body and two hingedly attached arm/gate elements extending at perpendicular and offset axes from the body, e.g. fixed at different angles (likely perpendicular in the preferred form) and offset in order to connect two perpendicular building members. Each gate or arm element is respectively associated with a tightening mechanism, e.g. a rod with a threaded end for engaging with a nut that controls closing force toward the main body and, thereby, clamping a building element. In use, the respective tightening mechanisms (e.g. nuts on threaded rod) are accessible from substantially the same direction relative to the main body and not obscured, when viewed in a frontal direction, by any of the building members. In practice, the two overlapping building elements are securable only in a fixed position relative to one another.

In principle, referring to FIG. 5, the rear tightening mechanism 17/19 may be configured to extend for access underneath horizontal member H. In other words, rather than having both tightening mechanisms accessible on the same (upper) side of the horizontal member H, the respective tightening mechanisms could be accessible above and below.

In a preferred form, the clamping function is achieved by the gates, compared to each other, having a reversed configuration of tightening mechanism extending between a distal end of the gate relative to a connection point on the main body. In other words, in a preferred example, a first gate houses a first connecting rod, extending from a distal end therefrom, for removeable engagement with an engagement feature of the main body, while a second connecting rod is housed by the main body, to extend for removeable engagement with an engagement feature at the distal end of the second gate.

The invention claimed is:

1. A coupler device, for connecting first and second building elements at a fixed right angle, the device comprising:

a backbone plate;

a first gate hingedly attached to a first side of the backbone plate for pivoting about a first fixed axis and configured to clamp a first tubular building element against the first side of the backbone plate by a first tightening mechanism including cooperating male and female threaded members;

a second gate hingedly attached to a second side of the backbone plate, opposite the first side, for pivoting about a second fixed axis that is offset at a right angle from the first fixed axis and configured to clamp a second tubular building element against the second side of the backbone plate by a second tightening mechanism including cooperating male and female threaded members;

wherein the first tightening mechanism and second tightening mechanism are respectively located beyond a plane defined by a side of the second tubular building element;

wherein each tightening mechanism is configured to be exposed and accessible for tightening by a user from a direction facing the second side of the backbone plate, when the first and second building elements are fixed in place at right angles.

2. The coupler device of claim 1, wherein one end of the first tightening mechanism is pivotally attached to a distal end of the first gate, while an end of the second tightening mechanism is pivotally attached from the backbone plate; wherein respective free ends of the first and second tightening mechanisms are free to engage with an engagement feature of the backbone plate and second gate respectively.

3. The coupler device of claim 2, wherein a free end of the first tightening mechanism is engageable with a portion of the backbone plate, while a free end of the second tightening mechanism is engageable with a distal end of the second gate.

4. The coupler device of claim 3, wherein the portion of the backbone plate engageable with the free end of the first tightening mechanism comprises a bifurcated part to provide a surface against which the female threaded member of the first tightening mechanism, in the form of a nut, can tighten; and wherein a distal end of the second gate comprises a bifurcated part to provide a surface against which the female threaded member of the second tightening mechanism, in the form of a nut, can tighten.

5. The coupler device of claim 1, wherein an internal surface of the first and second gates, facing the backbone plate, include a radial cutaway portion for accommodating a respective building element.

6. The coupler device of claim 1, wherein a surface of the backbone plate, facing at least one of the first and second gates, includes a radial cutaway portion for accommodating a respective building element.

7. The coupler device of claim 1, wherein each of the respective tightening mechanisms includes a connecting rod having a first threaded end, being the male threaded member, for engaging with a nut, being the female threaded member, and a second widened end for abutting with an opening in either the backbone plate or a respective gate and enabling a pivot point therewith for the rod.

8. The coupler device of claim 1, wherein the respective tightening mechanisms are located on a substantially common plane, configured to be accessible beyond the plane of the second building element.

9. The coupler device of claim 1, wherein the tightening mechanisms are located on a different plane to each other, configured to be accessible beyond the plane of the second building element.

\* \* \* \* \*